(12) United States Patent
Valerius et al.

(10) Patent No.: US 8,838,816 B2
(45) Date of Patent: Sep. 16, 2014

(54) SYSTEM AND METHOD FOR REMOTE PARTY RESTRICTIONS IN A COMMUNICATIONS SYSTEM

(75) Inventors: Lee Valerius, Carrollton, TX (US); Amarjit Deol, Frisco, TX (US); Lili Yang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 347 days.

(21) Appl. No.: 13/232,399

(22) Filed: Sep. 14, 2011

(65) Prior Publication Data

US 2012/0203860 A1 Aug. 9, 2012

Related U.S. Application Data

(60) Provisional application No. 61/440,314, filed on Feb. 7, 2011.

(51) Int. Cl.
*G06F 15/16* (2006.01)

(52) U.S. Cl.
USPC .......................... 709/229; 709/217; 709/223

(58) Field of Classification Search
None
See application file for complete search history.

(56) References Cited

U.S. PATENT DOCUMENTS

| | | | | |
|---|---|---|---|---|
| 2009/0185527 | A1* | 7/2009 | Akhtar et al. | 370/329 |
| 2010/0153117 | A1* | 6/2010 | Toupin | 704/272 |
| 2010/0153577 | A1 | 6/2010 | Wohlert et al. | |
| 2010/0228546 | A1* | 9/2010 | Dingler et al. | 704/235 |
| 2011/0138060 | A1* | 6/2011 | Purkayastha et al. | 709/227 |
| 2011/0145419 | A1* | 6/2011 | Shaheen et al. | 709/227 |
| 2011/0188449 | A1* | 8/2011 | Shaheen et al. | 370/328 |

OTHER PUBLICATIONS

Handley, M., et al., "SDP: Session Description Protocol," Network Working Group, RFC 4566, Jul. 2006, 50 pages.
Rosenberg, J., et al., "SIP: Session Initiation Protocol," Network Working Group, RFC 3261, Jun. 2002, 270 pages.
"3rd Generation Partnership Project; Technical Specification Group Services and System Aspects; IP Multimedia Subsystem (IMS) Service Continuity; Stage 2 (Release 9)," 3GPP TS 23.237, V9.7.0, Dec. 2010, 89 pages.
"3rd Generation Partnership Project; Technical Specification Group Services and System Aspects; IP Multimedia Subsystem (IMS) Service Continuity; Stage 2, (Release 10)," 3GPP TS 23.237, V10.4.1, Jan. 2011, 154 pages.
"3rd Generation Partnership Project; Technical Specification Group Services and System Aspects; IP Multimedia Subsystem (IMS); Stage 2, (Release 9)," 3GPP TS 23.228, V9.4.0, Sep. 2010, 253 pages.
"3rd Generation Partnership Project; Technical Specification Group Services and System Aspects; IP Multimedia Subsystem (IMS); Stage 2, (Release 10)," 3GPP TS 23.228, V10.3.1, Jan. 2011, 274 pages.

* cited by examiner

*Primary Examiner* — Moustafa M Meky
*Assistant Examiner* — Clayton R Williams
(74) *Attorney, Agent, or Firm* — Slater & Matsil, L.L.P.

(57) ABSTRACT

A system and method for remote party restrictions in a communications system are provided. A method for controller operations includes receiving a request from a first communications device to replicate a media flow that is being transmitted to the first communications device from a second communications device during a session, where the replicated media flow is to be provided to a third communications device, and where the second communications device is operated by a remote user. The method also includes allocating resources to a transmission of the replicated media flow to the third communications device, notifying the remote user of the request, and determining a response of the remote user to the request.

32 Claims, 6 Drawing Sheets

SYSTEM AND METHOD FOR REMOTE PARTY RESTRICTIONS IN A COMMUNICATIONS SYSTEM

This application claims the benefit of U.S. Provisional Application No. 61/440,314, filed on Feb. 7, 2011, entitled "Mechanism to Protect User Privacy in Multiple-User IP Multimedia Subsystem Inter-UE Transfer," which application is hereby incorporated herein by reference.

TECHNICAL FIELD

The present invention relates generally to digital communications, and more particularly to a system and method for remote party restrictions in a communications system.

BACKGROUND

The Third Generation Partnership Project (3GPP) is a collaboration between groups of telecommunications associations, to make globally applicable third-generation (3G) and beyond mobile phone system specifications within the scope of the International Mobile Telecommunications-2000 (IMT-2000) project of the International Telecommunication Union (ITU). The 3GPP specifications are based on evolved Global System for Mobile Communications (GSM) specifications. 3GPP standardization encompasses Radio, Core Network, and Service architecture aspects.

The 3GPP Internet Protocol (IP) Multimedia Subsystem (IMS) specifications describe a system capability in which more than two User Equipment (UE), also commonly referred to as mobile stations, communications devices, users, subscribers, terminals, and so on, may participate in a single IMS session (or simply, a session) and share media, such as video, audio, text, multimedia, and so forth. In Release 9 of the 3GPP specifications, the IMS Service Continuity capability was extended with an Inter-UE Transfer (IUT) feature. The IUT allows for an enrichment of the communications experience by permitting multiple media flows on a local end to be distributed among an IMS user's multiple devices in the context of a single collaborative session. In Release 10 of the 3GPP specifications, the IUT was further enhanced to permit collaboration among multiple users on the local end. However, in Release 10, no consideration was given to potential privacy and/or charging considerations for the remote party, also commonly referred to as a remote end, of a collaborative session.

SUMMARY OF THE INVENTION

These and other technical advantages are generally achieved, by example embodiments of the present invention which provide a system and method for sharing media in a communications system.

In accordance with an example embodiment of the present invention, a method for controller operations is provided. The method includes receiving a request from a first communications device to replicate a media flow that is being transmitted to the first communications device from a second communications device during a session, where the request requests that the replicated media flow be provided to a third communications device, and where the second communications device is operated by a remote user. The method also includes allocating resources to a transmission of the replicated media flow to the third communications device, notifying the remote user of the request, and determining a response of the remote user to the request.

In accordance with another example embodiment of the present invention, a method for communications device operations is provided. The method receiving a request from a first communications device to replicate a media flow that is being transmitted to the first communications device from a second communications device during a session, where the request requests that the replicated media flow be provided to a third communications device, and where the second communications device is operated by a remote user. The method also includes notifying the remote user of the request, and determining a response from the remote user indicating whether or not the remote user agrees to allow the third communications device to receive the replicated media flow. The method further includes responding to the request responsive to the response from the remote user.

In accordance with another example embodiment of the present invention, a device is provided. The device includes a receiver, a resource allocating unit, and a notification unit. The receiver receives a request from a first communications device to replicate a media flow that is being transmitted to the first communications device from a second communications device during a session, where the request requests that the replicated media flow be provided to a third communications device, and where the second communications device is operated by a remote user. The resource allocation unit allocates resources to a transmission of the replicated media flow to the third communications device. The notification unit notifies the remote user of the request, and determines a response of the remote user to the request.

One advantage disclosed herein is that, following notification of a remote party and/or user, all parties involved in a collaborative session know about the other parties in the session. Therefore, a remote party concerned about privacy and/or a remote party that will be charged for the establishment of a new access leg will be able to determine and indicate if it wishes to accept or reject a requested IUT operation.

A further advantage of exemplary embodiments is that minor changes are required to existing hardware and/or software infrastructure, so implementing the exemplary embodiments may occur quickly and with relatively small cost.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
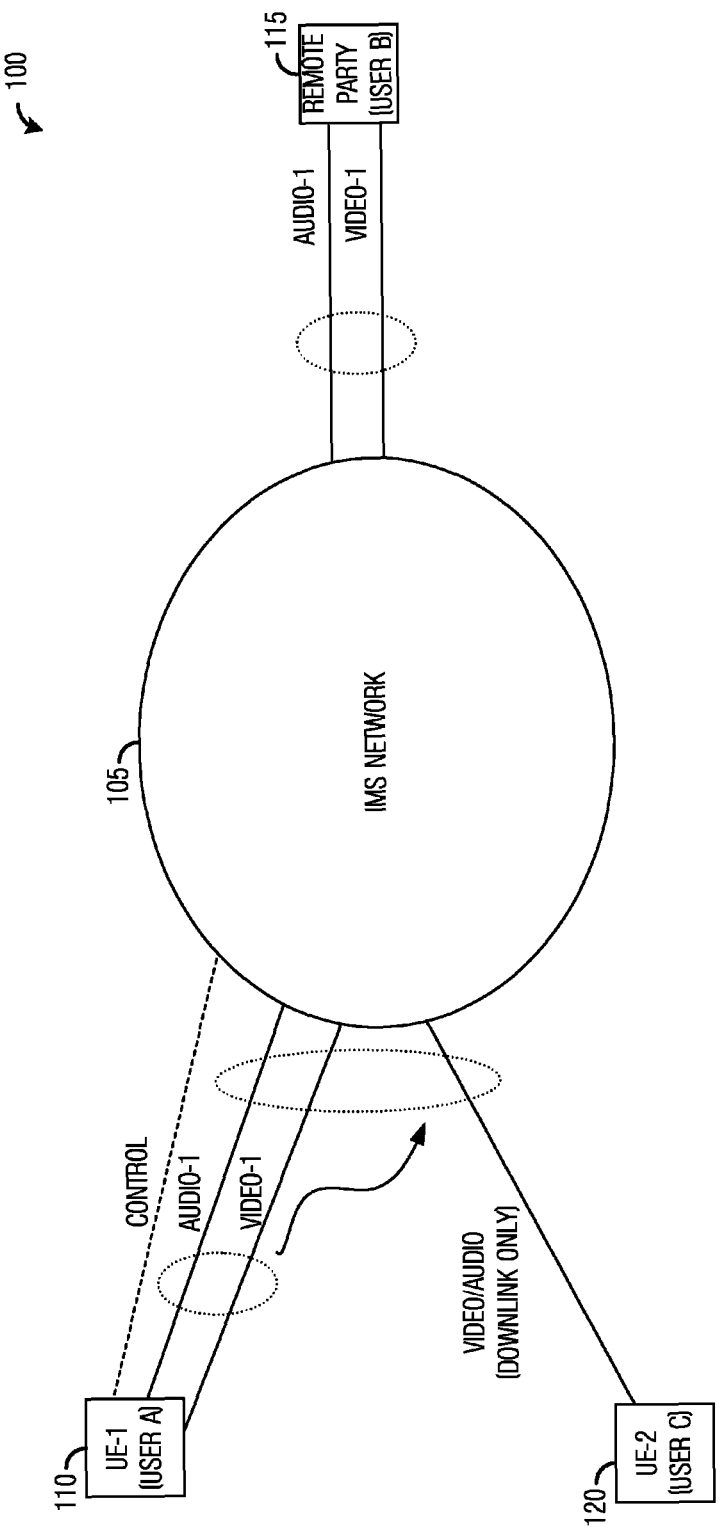
FIG. 1 illustrates an example communications system, highlighting an IUT scenario according to example embodiments described herein.

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to meeting privacy and/or billing concerns of a remote user of a session. For example, upon receiving a request from a first communications device to replicate a media flow received that is transmitted to the first communications device from a second communications device during a session, where the request requests that the replicated media flow be provided to a third communications device and where the second communications device is operated by a remote user. A controller allocates resources for a transmission of the replicated media flow to the third communications device and notifies a remote user of the second communications device of the request. The controller determines the response of the remote user to determine how to proceed with the request. At a second communications device operated by a remote user, the second communications device receives a request from a first communications device to replicate a media flow that is being transmitted to the first communications device from the remote device, where the replicated media flow is to be provided to a third communications device. The second communications device notifies the remote user of the request and determines a response from the remote user, where the response indicates whether or not the remote user agrees to allow the third communications device to receive the replicated media flow. The second communications device responds to the request responsive to the response of the remote user.

The present invention will be described with respect to example embodiments in a specific context, namely a 3GPP Release 10 compliant communications system. The invention may also be applied, however, to other standards compliant communications systems, such as IEEE 802.16, WiMAX, 3GPP LTE, and so forth, as well as non-standards compliant communications systems, that support IMS sessions.

As discussed above, in 3GPP Release 9 technical standards, IMS Service Continuity was extended with the IUT feature. The IUT permits multiple media flows to be distributed among an IMS user's multiple devices in the context of a single collaborative session that may be controlled through a single device.

In 3GPP Release 10, the IUT was enhanced to permit collaboration on a local end among multiple users. Therefore, a different IMS user's device may share the media flows with other devices in the collaborative session.

In 3GPP Release 10, work regarding IUT enhancements proceeded under the assumption that a remote end user's device neither requires enhancements to support IUT nor is aware that collaboration is taking place. This assumption is expressed in 3GPP Technical Standards TS 23.237, IMS Service Continuity, in the following way: "The Collaborative Session is transparent to the remote end, to which it appears that the session is with the Controller UE." Here, the term "Collaborative Session" refers to an IMS session that has been subject to IUT operations—that is, a session which has media flows that are distributed across multiple devices. That the device at the remote end requires no enhancements for IUT to take place on the local end is an important enabler for widespread acceptance and use of the service. However, the fact that the remote end device is unaware that collaboration is taking place means that the user at the remote party device is also unaware (unless made aware through communication with the IUT user).

Therefore new concerns have arisen from the IUT enhancements put forth in 3GPP Release 10. A first concern may center on privacy issues for a remote party in a multi-user collaborative session, since the remote party may not be aware of all participants of the multi-user collaborative session, thereby potentially compromising the privacy of the remote party. Furthermore, the remote party may not even be aware that the media flow(s) are being replicated to other devices and/or users.

An additional concern may be in regard to billing. In many communications systems, billing may be configured so that an initiator of an IMS session pays for all resources used in the session. Therefore, if the initiator of the session becomes the remote party in a collaborative session due to IUT, the initiator may not know how many participants are participating in the collaborative session (and/or that he is paying for resources used to provide the media flow(s) to the participants that he does not know about) and may be surprised when he is charged a great deal more money than expected for the collaborative session.

FIG. 1 illustrates a communications system 100, highlighting an IUT scenario. While it is understood that communications systems may employ multiple networks and UEs, only one network, two UEs, and one remote party are illustrated for simplicity.

Communications system 100 includes an IMS network 105 that provides connectivity and/or services to users connected to IMS network 105. Communications system 100 also includes a first UE (UE-1) 110 operated by a first user (USER A) and a remote party 115 operated by a second user (USER B). UE-1 110 and remote party 115 may be participating in a multimedia session with media flows (labeled AUDIO-1 and VIDEO-1) being shared between the two participants of the multimedia session.

While the multimedia session is occurring, USER A may request that one or more media flows be shared with a second UE (UE-2) 120 operated by a third user (e.g., USER C). USER A may request that the one or more media flows be shared with UE-2 120 by sending a request to a network element in IMS network 105, for example, a media resource function or processor (MRF or MRP) under the control of a Service Centralization and Continuity Application Server (SCC AS). As shown in FIG. 1, the one or more media flows may be provided to UE-2 120 in a uni-directional, downlink only flow from remote party 115 to UE-2 120.

Therefore, there is a need for a system and method to inform remote users of all participants in an IMS session so that such users may be able to take action with respect to concerns, such as privacy, billing, and so forth.

According to an example embodiment, the concerns arising from the IUT enhancements set forth in 3GPP Release 10 may be addressed by introducing additional signaling to inform a remote party(s) that a new device(s) and/or user(s) has(have) been added or want to be added to the session, and giving the remote party(s) an option of allowing the new device(s) and/or user(s) to join the session, of not allowing the new device(s) and/or user(s) to join the session and continuing with the session as it was before the IUT request was received by the network, or to simply terminate the session altogether.

Figure 2:
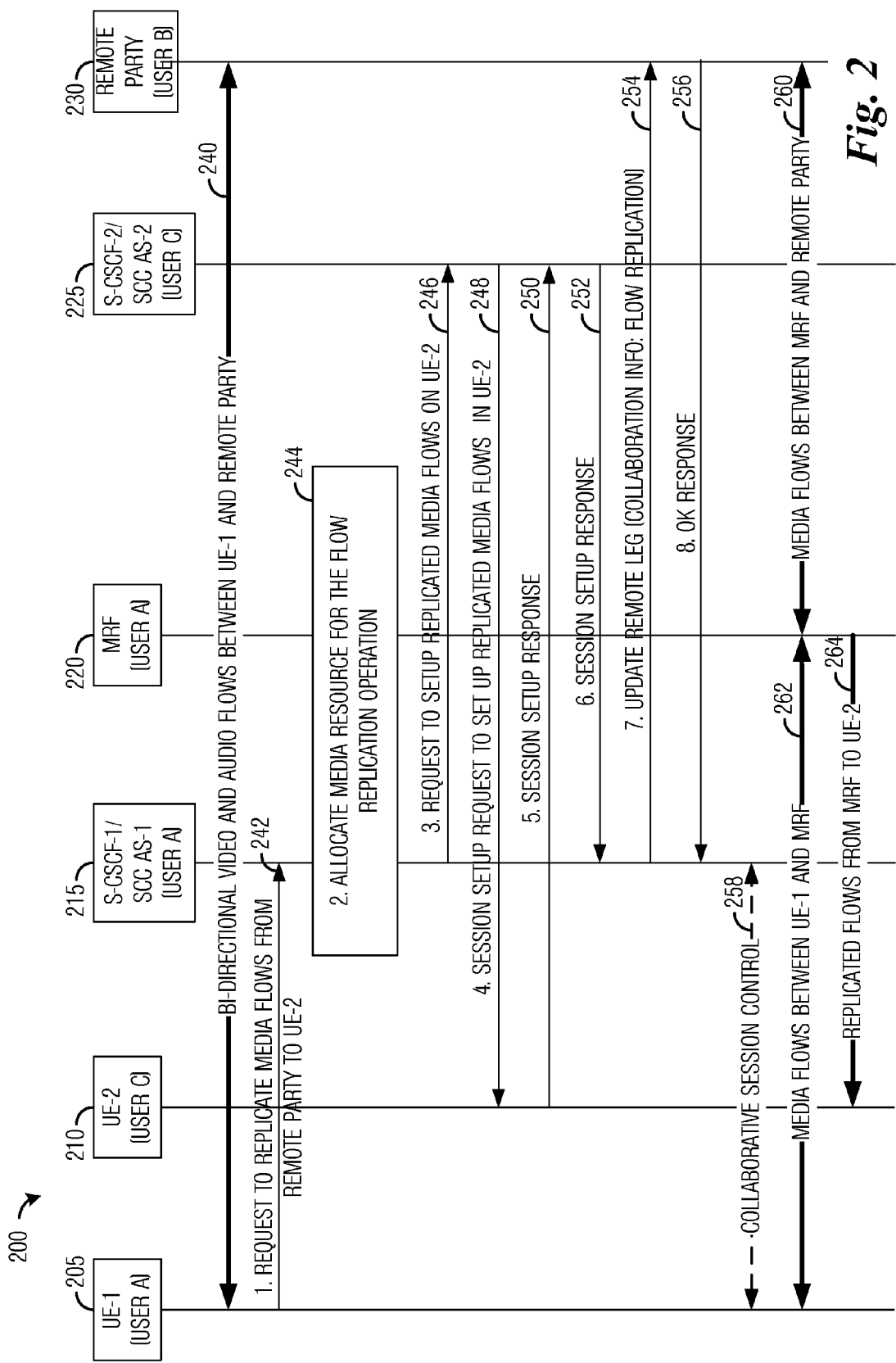
FIG. 2 illustrates an example message flow in a communications system in an addition of a user and/or device to an IMS session according to example embodiments described herein.

FIG. 2 illustrates a message flow 200 in a communications system in an addition of a user and/or device to an IMS session. FIG. 2 illustrates messages exchanged between entities in the communications system as a remote party responds affirmatively to the request to add a user and/or device to an IMS session in which the remote party is a participant. As shown in FIG. 2, message flow 200 includes a first UE (UE-1) 205 operated by USER A, a second UE (UE-2) 210 operated by USER C, a serving call session control function (S-CSCF) for USER A/service centralization and continuity application server (SCC AS) for USER A 215, a MRF for USER A 220, an S-CSCF for USER C/SCC AS for USER C 225, and a remote party 230 operated by USER B.

Message flow 200 may begin with one or more bi-directional media flows 240 (e.g., video and/or audio) between UE-1 205 and remote party 230. Bi-directional media flows 240 are supported in the context of an IMS session.

UE-1 205 may decide to request that the communications system replicate one or more media flows (video, audio, or both video and audio, for example) received from remote party 230 towards UE-2 210 (shown as event 242). UE-2 210 may be operated by USER C. The one or more media flows are presented to UE-2 210 only, meaning that UE-2 210 may not contribute its own media or control the presentation of the media. According to an example embodiment, UE-1 205 may direct its request to S-CSCF/SCC AS 215. The replication of the one or more media flows may be performed by an MRF, such as MRF 220, under the control of S-CSCF/SCC AS 215.

S-CSCF/SCC AS 215 and MRF 220 may exchange signaling 244 to allocate resources needed to replicate the one or more media flows. Additionally, S-CSCF/SCC AS 215 may send a request to S-CSCF/SCC AS 225 to set up an access leg for UE-2 210 to convey the allocated resources (shown as events 246, 248, 250, and 252).

For discussion purposes, consider a situation wherein S-CSCF/SCC AS 215, MRF 220, S-CSCF/SCC AS 225, and UE-2 210 are successful in allocating resources needed to replicate the requested one or more media flows from remote party 230 to UE-2 210. Remote party 230 may then be informed that UE-1 205 desires to add UE-2 210 to the IMS session (shown as event 254).

According to an example embodiment, S-CSCF/SCC AS 215 may inform remote party 230 by using an INVITE message in the context of an "Update Remote Leg" transaction with message fields set to indicate FLOW REPLICATION as well as to identify UE-2 210 as the intended target of the replicated media flow(s). Upon receipt of the INVITE message, a prompt may appear on a display used by USER B of remote party 230 that informs USER B that UE-1 205 wishes to add UE-2 210 to the IMS session.

IUT operations assume the use of Session Initiation Protocol (SIP) for IMS session establishment, with embedded Session Description Protocol (SDP) information to describe media flow components and the precise nature of requested IUT operations. The example embodiment utilizing 'additional signaling' as described herein is an extension to the SDP protocol. The extension may take the form of an additional SDP "a=" (attribute) value named "a=target". The complete solution includes the addition of a procedure at S-CSCF/SCC AS 215 to be invoked in conjunction with the "Update Remote Leg" transaction.

According to an example embodiment, the SDP "a=target" value conveys the following information:

In the direction toward the remote end of the session, the identity of the user with whom the media flow pertaining to the associated "m=" (media description) line is being shared.

Per 3GPP RFC 4566, the general syntax of the SDP "a=" (attributes) line is as follows:

a=<attribute>:<value>.

The specific syntax of the "a=target" attribute is as follows:

a=target: SIP-URI, where "SIP-URI" is a SIP Uniform Resource Identifier as defined in SIP.

In the example embodiment presently described, the "a=target" attribute is included in the SIP message (e.g., a re-INVITE message) that is sent by S-CSCF/SCC AS 215 to the remote UE (e.g., remote party 230) in order to update the network-side media endpoint (i.e., MRF) in the remote UE. In the same message, the SCC AS also includes the SDP attribute line that indicates the nature of the requested IUT operation (e.g., replicate media flow within the IMS network). With the additional information available in the signaling, the remote UE can inform the remote end user, i.e., a user of remote party 230, of the nature of the requested/expected IUT operation and the identity of the intended consumer of the media on the local end of the session. If the situation is unacceptable to the remote end user, the remote end user can then choose to reject the requested IUT operation; in this case, the remote UE may deny the entire "Update Remote Leg" transaction by means of responding with an appropriate SIP error code, for example.

In the example embodiment as described above, S-CSCF/SCC AS 215 may inform remote party 230 through signaling (i.e., the INVITE message) using what may be described as out-of-band signaling.

According to an example embodiment, S-CSCF/SCC AS 215 may also use in-band signaling to inform remote party 230. In-band signaling may involve embedding information, data, or so forth, in one or more of the media flows being shared with remote party 230. For example, a tone, audible prompt, audio message, or so forth, may be embedded into an audio media flow or an audio component of a media flow being shared with remote party 230. As another example, a graphic, text, an image, or so on, may be embedded into a video media flow or a video component of a media flow being shared with remote party 230.

According to an example embodiment, a device (e.g., remote party 230) at the remote end of the session which has not been enhanced to support the new SDP "a=target" attribute should ignore it and process the remainder of the received SDP package as usual. An enhanced device, however, may utilize the contents of the "a=target" attribute to present some form of notification to the remote end user that the associated media flow is to be shared with another user. An enhanced device may also permit the end user at the remote end of the session to, by way of an appropriate SIP error code response, deny or reject the indicated IUT operation.

According to an example embodiment, the prompt may appear in the form of text, a picture or icon, an audio tone or music, or combinations thereof to inform USER B that UE-1 205 wishes to add UE-2 210 to the IMS session.

According to an example embodiment, after the prompt, USER B may be given a chance to respond. For example, USER B may be asked to allow UE-2 210 to be added or to disallow UE-2 210 from being added.

According to an example embodiment, after the prompt, the IMS session may continue as if no attempt to add UE-2 210 has occurred and it may be up to USER B to allow the addition of UE-2 210, to reject the addition of UE-2 210, to terminate the IMS session, or so on.

According to an example embodiment, after the prompt, the IMS session may continue with a programmed default. For example, the IMS session may continue with a default being to allow the addition of the UE-2 210. If USER B does not wish UE-2 210 to be added, USER B needs to specifically reject the addition of UE-2 210. Alternatively, the IMS session may continue with a default being to reject the addition of the UE-2 210. If USER B does wish UE-2 210 to be added, USER B needs to specifically allow the addition of UE-2 210.

For discussion purposes, consider a situation wherein USER B allows UE-2 210 to be added to the IMS session. USER B may respond to the INVITE message with an OK response sent to S-CSCF/SCC AS 215 (shown as event 256). Collaborative session control may be established for UE-1 205 with S-CSCF/SCC AS 215 (shown as event 258). Media flows between UE-1 205 and remote party 230 will now be directed to MRF 220 (shown as events 260 and 262), which may pass the media flows onto their intended recipient as well as replicate the requested one or more media flows from remote party 230 to UE-2 210 (shown as event 264).

The functions enabled by the described protocol enhancement provide both notification of the device at the remote end of the IMS session as well as the opportunity for the remote end user to reject the requested IUT operation. Because remote end devices are not required to be enhanced in any way in order to support IUT (collaboration) at the local end, it may not possible to deny the IUT operation on the local end if a positive (i.e. 'authorized') indication is not received from the remote end. With the protocol mechanism described in this paper, however, it is possible to permit an enhanced device at the remote end to deny the IUT operation to proceed on the local end.

Figure 3:
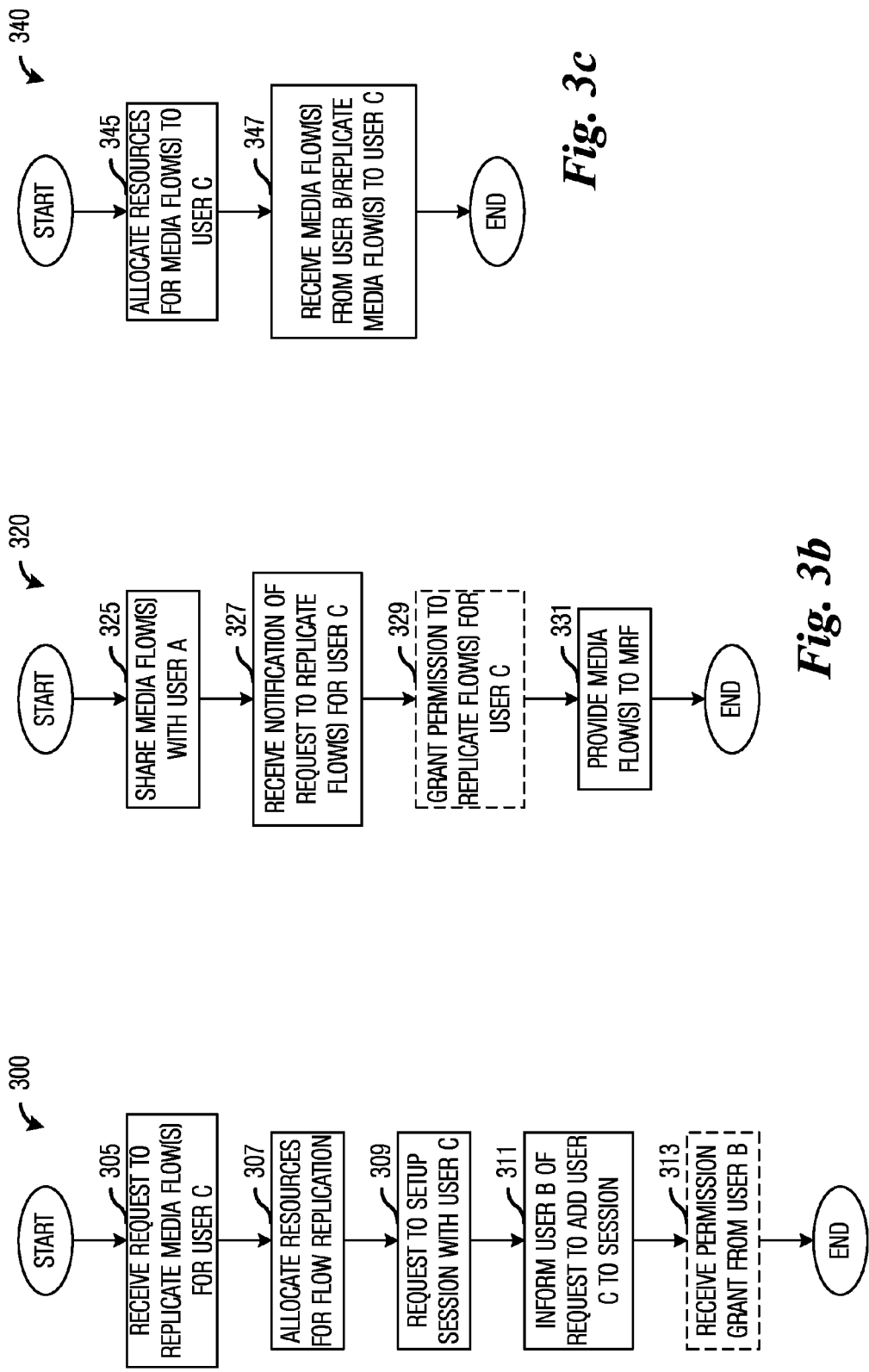
FIG. 3a illustrates an example flow diagram of S-CSCF/ SCC AS operations in adding a new user to an IMS session according to example embodiments described herein.
FIG. 3b illustrates an example flow diagram of remote end operations in adding a new user to an IMS session according to example embodiments described herein.
FIG. 3c illustrates an example flow diagram of MRF operations in adding a new user to an IMS session according to example embodiments described herein.

FIG. 3*a* illustrates a flow diagram of S-CSCF/SCC AS operations 300 in adding a new user to an IMS session. S-CSCF/SCC AS operations 300 may be indicative of operations occurring in an S-CSCF/SCC AS, such as S-CSCF/SCC AS 215, of a communications system as an IUT user, supported by the S-SCSF/SCC AS, wishes to add a new user to the session. S-CSCF/SCC AS operations 300 may occur while the S-CSCF/SCC AS is in a normal operating mode.

S-CSCF/SCC AS operations 300 may begin with the S-CSCF/SCC AS receiving a request from USER A to replicate one or more media flows received from the remote user to USER C (block 305). In other words, USER A is requesting that USER C be added to the session as a 'receive-only' participant.

The S-CSCF/SCC AS may allocate resources for the replication of the one or more media flows to USER C (block 307). Allocation of resources for the replication of the one or more media flows may include the S-CSCF/SCC AS and an MRF for USER A communicating to allocate the resources. An SCC AS portion of the S-CSCF/SCC AS may also send a message to an S-CSCF portion of the S-CSCF/SCC AS for USER C to request a setup of resources for the replicated one or more media flows (which in turn, may result in a session setup request from the S-CSCF of USER C to USER C) (block 309).

The S-CSCF/SCC AS may inform the remote user of the request to add USER C to the session (block 311). As discussed previously, the S-CSCF/SCC AS may inform the remote user of the request to add USER C to the session through the use out-of-band signaling, such as through the use of an "Update Remote Leg" transaction with message fields set to indicate FLOW REPLICATION and to identify the intended target of the replicated media flow(s).

Alternatively, rather than using out-of-band signaling techniques, S-CSCF/SCC AS may use in-band signaling techniques to inform the remote use of the request to add USER C to the session.

As shown in FIG. 3*a*, the S-CSCF/SCC AS receives a response from the remote user granting permission to add USER C to the session (block 313). Alternatively, the S-CSCF/SCC AS may consider that the remote user has granted permission to add USER C to the session unless it receives a response explicitly rejecting the addition of USER C to the session.

FIG. 3*b* illustrates a flow diagram of remote end operations 320 in adding a new user to an IMS session. Remote end operations 320 may be indicative of operations occurring in a session user, such as USER B and/or remote party 230, as the remote end confirms the addition of a new user to the session. Remote end operations 320 may occur while the remote end is operating in a normal operating mode.

Remote end operations 320 may begin with the remote end sharing media flows with USER A in an IMS session (block 325). The remote end may then receive a notification of a request to replicate one or more media flows for USER C (block 327). According to an example embodiment, the remote end may be informed using out-of-band and/or in-band signaling techniques. An example of out-of-band signaling may include the notification being delivered in the form of an "UPDATE REMOTE LEG" transaction with message fields set to indicate FLOW REPLICATION and to identify the intended target of the replicated media flow(s).

The remote end may provide a prompt to USER B to inform the user of the request. According to an example embodiment, the prompt may be in the form of text, a picture or icon, an audio tone or music, or combinations thereof.

USER B may respond to the prompt, and if it does, the remote end may respond to the request. For example, USER B may grant permission to replicate the media flows for USER C and the permission grant may be transmitted in the form of a response message to the request (block 329).

Alternatively, USER B may rely on default responses. For example, a default response to the request may be to allow the replication of the media flows for USER C or to disallow the replication of the media flows for USER C. The remote end device may then respond according to the default response.

The remote end may provide the media flows to an MRF, such as MRF 220, (block 331) which may then provide the media flows to USER A and replicate the requested one or more media flows to USER C.

FIG. 3c illustrates a flow diagram of MRF operations 340 in adding a new user to a session. MRF operations 340 may be indicative of operations occurring in a MRF, such as MRF 220, as a user, such as USER A, supported by the MRF is participating in an IMS session wherein there is a desire to add a new user to the session. MRF operations 340 may occur while the MRF is in a normal operating mode.

MRF operations 340 may begin with the MRF allocating resources for the replication of media flows to USER C (block 345). The MRF may allocate the resource based on a request from the S-CSCF/SCC AS of USER A. The MRF may then serve as an intermediary for media flows between USER A and the remote end as well as replicating the requested one or more media flows and delivering them to USER C (block 347).

Figure 4:
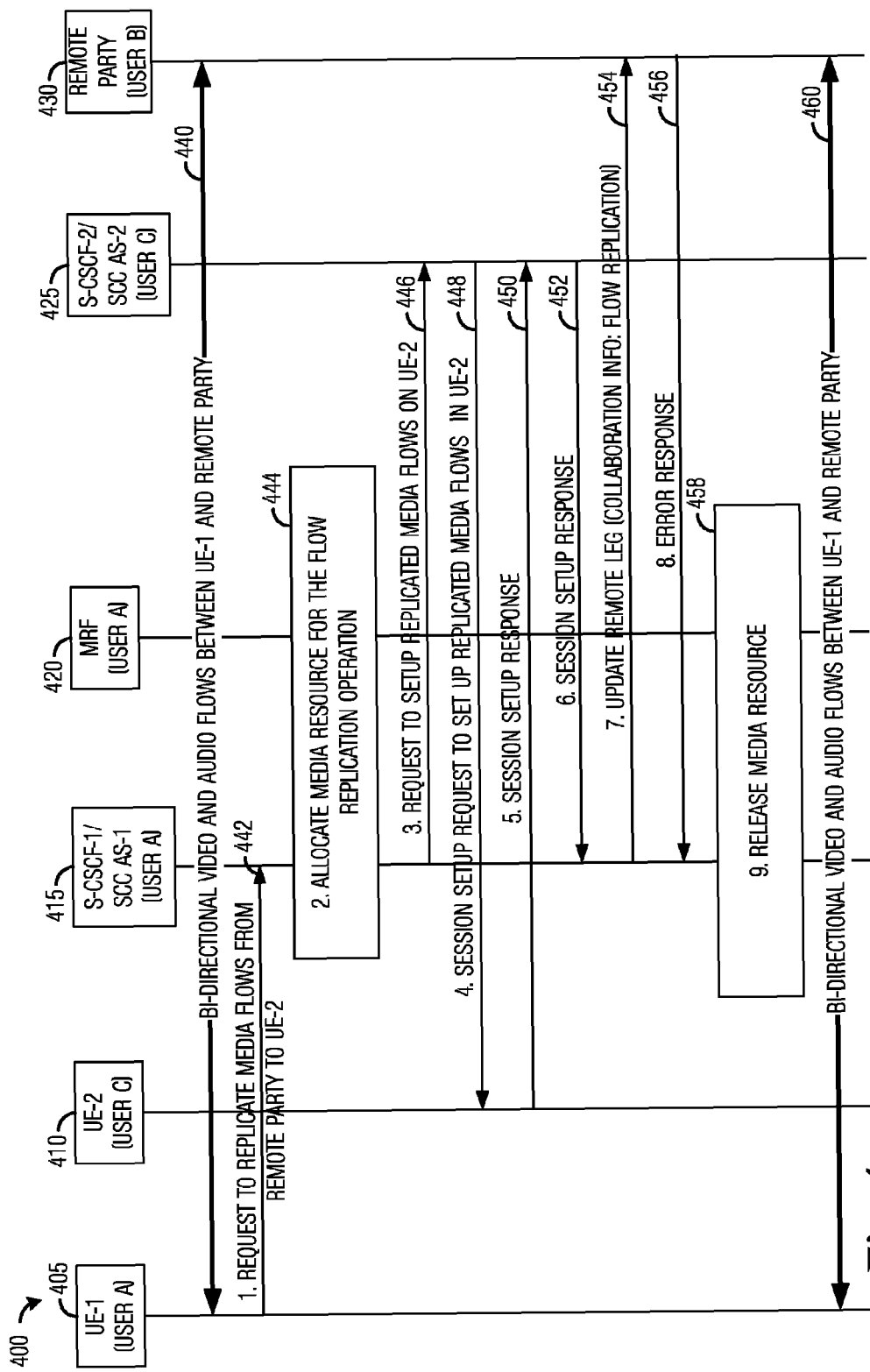
FIG. 4 illustrates an example message flow in a communications system in a rejection of a request to add a user and/or device to an IMS session according to example embodiments described herein.

FIG. 4 illustrates a message flow 400 in a communications system in a rejection of the addition of a user and/or device to an IMS session. FIG. 4 illustrates messages exchanged between entities in the communications system as a remote party responds negatively to the request to add a user and/or device to a session in which the remote party is a participant. As shown in FIG. 4, message flow 400 includes a first UE (UE-1) 405 operated by USER A, a second UE (UE-2) 410 operated by USER C, an S-CSCF for USER A/SCC AS for USER A 415, an MRF for USER A 420, an S-CSCF for USER C/SCC AS for USER C 425, and a remote party 430 operated by USER B.

Message flow 400 may begin with bi-directional media flows 440 (e.g., video and audio) between UE-1 405 and remote party 430. Bi-directional media flows 440 are supported in the context of an IMS session.

UE-1 405 may decide to request that the communications system replicate one or more media flows (video, audio, or both video and audio, for example) towards UE-2 410 (shown as event 442). UE-2 410 is operated by USER C. The one or more media flows may be presented to UE-2 410 only, meaning that UE-2 410 may not contribute its own media or control the presentation of the media. According to an example embodiment, UE-1 405 may direct its request to S-CSCF/SCC AS 415. The replication of the one or more media flows may be performed by an MRF, such as MRF 420, under the control of S-CSCF/SCC AS 415.

S-CSCF/SCC AS 415 and MRF 420 may exchange signaling 444 to allocate resources needed to replicate the one or more media flows. Additionally, S-CSCF/SCC AS 415 may send a request to S-CSCF/SCC AS 425 to set up an access leg for UE-2 410 (shown as events 446, 448, 450, and 452).

For discussion purposes, consider a situation wherein S-CSCF/SCC AS 415, MRF 420, S-CSCF/SCC AS 425, and UE-2 410 are successful in allocating resources needed to replicate the requested one or more media flows from remote party 430 to UE-2 410. Remote party 430 may then be informed that UE-1 405 desires to add UE-2 410 to the IMS session (shown as event 454).

According to an example embodiment, S-CSCF/SCC AS 415 may inform remote party 430 by out-of-band signaling, such as by using an INVITE message in the context of the "Update Remote Leg" transaction with message fields set to indicate FLOW REPLICATION and to identify UE-2 410 as the intended target of the replicated media flow(s). Upon receipt of the INVITE message, a prompt may appear on a display used by USER B of remote party 430 that informs USER B that UE-1 405 wishes to add UE-2 410 to the IMS session. Alternatively, S-CSCF/SCC AS 415 may inform remote party 430 using in-band signaling.

According to an example embodiment, the prompt may appear in the form of text, a picture or icon, an audio tone or music, or combinations thereof to inform USER B that UE-1 405 wishes to add UE-2 410 to the IMS session.

According to an example embodiment, after the prompt, USER B may be given a chance to respond. For example, USER B may be asked to allow UE-2 410 to be added or to disallow UE-2 410 from being added.

According to an example embodiment, after the prompt, the IMS session may continue as if no attempt to add UE-2 410 has occurred and it may be up to USER B to allow the addition of UE-2 410, to reject the addition of UE-2 410, to terminate the IMS session, or so on.

According to an example embodiment, after the prompt, the IMS session may continue with a programmed default. For example, the IMS session may continue with a default being to allow the addition of the UE-2 410. If USER B does not wish UE-2 410 to be added, USER B needs to specifically reject the addition of UE-2 410. Alternatively, the IMS session may continue with a default being to reject the addition of the UE-2 410. If USER B does wish UE-2 410 to be added, USER B needs to specifically allow the addition of UE-2 410.

For discussion purposes, consider a situation wherein USER B does not allow UE-2 410 to be added to the IMS session. USER B may respond to the INVITE message with an error (or otherwise negative) response sent to S-CSCF/SCC AS 415 (shown as event 456).

With the USER B rejecting the addition of UE-2 410 to the IMS session, resources allocated for the replication of the one or more media flows, including the access leg for UE-2 410, may be released (block 458). Media flows between UE-1 and remote party 430 may continue (shown as event 460).

Figure 5C:
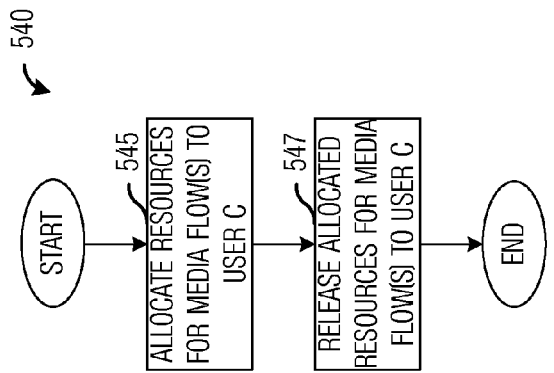
FIG. 5c illustrates an example flow diagram of MRF operations in rejecting a request for adding a new user to an IMS session according to example embodiments described herein.
Figure 5B:
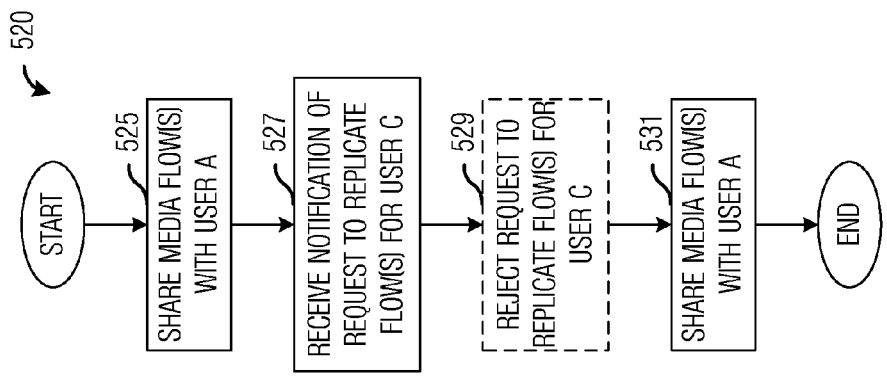
FIG. 5b illustrates an example flow diagram of remote end operations in rejecting a request for adding a new user to an IMS session according to example embodiments described herein.
Figure 5A:
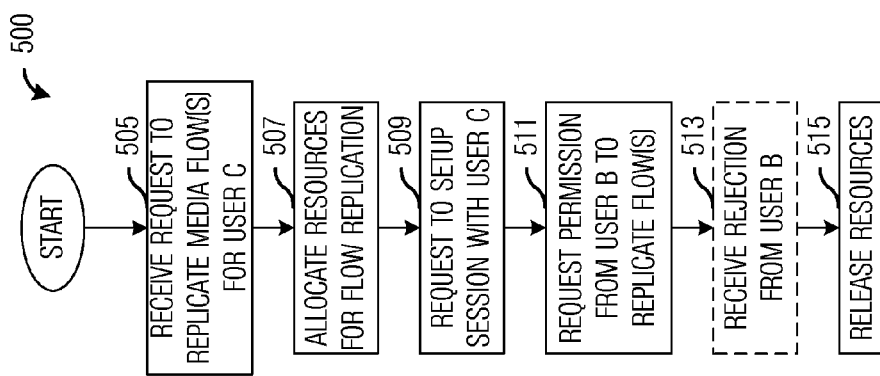
FIG. 5a illustrates an example flow diagram of S-CSCF/ SCC AS operations in rejecting a request for adding a new user to an IMS session according to example embodiments described herein.

FIG. 5a illustrates a flow diagram of S-CSCF/SCC AS operations 500 in rejecting a request to add a new user to an IMS session. S-CSCF/SCC AS operations 500 may be indicative of operations occurring in an S-CSCF/SCC AS, such as S-CSCF/SCC AS 415, of a communications system as an IUT user, supported by the S-SCSF/SCC AS, wishes to add a new user to the session. S-CSCF/SCC AS operations 500 may occur while the S-CSCF/SCC AS is in a normal operating mode.

S-CSCF/SCC AS operations 500 may begin with the S-CSCF/SCC AS receiving a request from USER A to replicate one or more media flows received from the remote user to USER C (block 505). In other words, USER A is requesting that USER C be added to the session as a 'receive only' participant.

The S-CSCF/SCC AS may allocate resources for the replication of the one or more media flows to USER C (block 507). Allocation of resources for the replication of the one or more media flows may include the S-CSCF/SCC AS and an MRF for USER A communicating to allocate the resources. An SCC AS portion of the S-CSCF/SCC AS may also send a message to an S-CSCF portion of the S-CSCF/SCC AS for USER C to request a setup of resources for the replicated one or more media flows (which in turn, may result in a session setup request from the S-CSCF/SCC AS of USER C to USER C) (block 509).

The S-CSCF/SCC AS may inform the remote user of the request to add USER C to the session (block 511). As discussed previously, the S-CSCF/SCC AS may inform the remote user of the request to add USER C to the session using out-of-band signaling, such as through the use of an "UPDATE REMOTE LEG" transaction with message fields set to indicate FLOW REPLICATION and to identify the intended target of the replicated media flow(s). Alternatively, the S-CSCF/SCC AS may use in-band signaling techniques to inform the remote use of the request to add USER C to the session.

As shown in FIG. 5a, the S-CSCF/SCC AS receives a response from the remote user not granting permission to add USER C to the session (block 513).

With the request to add USER C to the session having been rejected, the S-CSCF/SCC AS may release resources allocated for the replication of the one or more media flows to USER C (block 515).

FIG. 5b illustrates a flow diagram of remote end operations 520 in rejecting a request for adding a new user to an IMS session. Remote end operations 520 may be indicative of operations occurring in a session user, such as USER B and/or remote end 430, as the remote end rejects the request for the addition of a new user to the session. Remote end operations 520 may occur while the remote end is operating in a normal operating mode.

Remote end operations 520 may begin with the remote end sharing media flows with USER A in an IMS session (block 525). The remote end may then receive a notification of a request to replicate one or more media flows for USER C (block 527). According to an example embodiment, the notification may be delivered using out-of-band signaling, such as in the form of an "Update Remote Leg" transaction with message fields set to indicate FLOW REPLICATION and to identify the intended target of the replicated media flow(s). Alternatively, in-band signaling may be used.

The remote end may provide a prompt to USER B to inform the user of the request. According to an example embodiment, the prompt may be in the form of text, a picture or icon, an audio tone or music, or combinations thereof.

USER B may respond to the prompt, and if it does, the remote end may respond to the notification of the request. For example, USER B may not grant permission to replicate the media flows for USER C, and the rejection of the request may be transmitted in the form of an error (or otherwise negative) response message (block 529).

Alternatively, USER B may rely on default responses. For example, a default response to the request may be to disallow the replication of the media flows for USER C or to allow the replication of the media flows for USER C. The remote end device may then respond according to the default response.

The remote end may continue to share the media flows with USER A (block 531).

FIG. 5c illustrates a flow diagram of MRF operations 540 in rejecting a request for adding a new user to an IMS session. MRF operations 540 may be indicative of operations occurring in a MRF, such as MRF 420, as a user, such as USER A, supported by the MRF, is participating in an IMS session wherein there is a desire to add a new user to the session. MRF operations 540 may occur while the MRF is in a normal operating mode.

MRF operations 540 may begin with the MRF allocating resources for the replication of media flows to USER C (block 545). The MRF may allocate the resources based on a request from the S-CSCF/SCC AS of USER A. With the request to add USER C to the session being rejected, the MRF may then release resources allocated for the replication of the one or more media flows to USER C (block 547).

Figure 6:
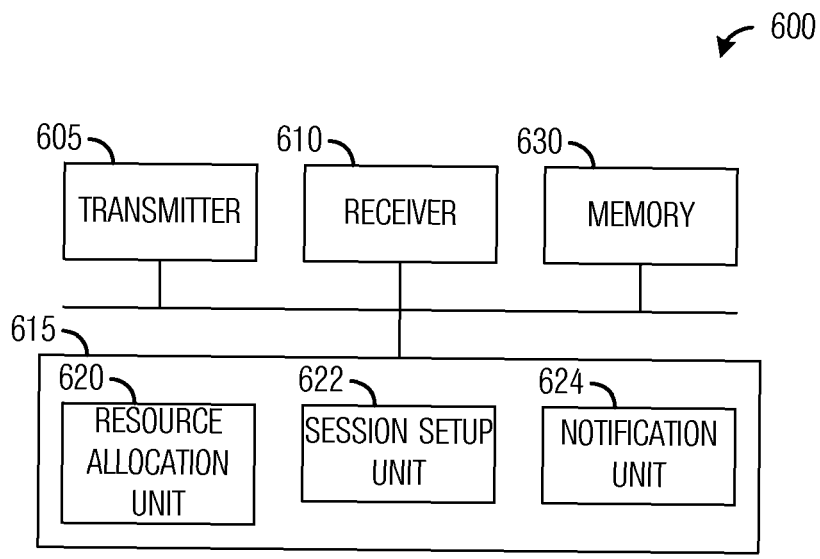
FIG. 6 illustrates an example first device according to example embodiments described herein.

FIG. 6 provides an alternate illustration of a device 600. Device 600 may be an implementation of a controller, such as an S-CSCF or a S-CSCF/SCC AS, of a communications system. Device 600 may be used to implement various ones of the embodiments discussed herein. As shown in FIG. 6, a transmitter 605 is configured to send messages, information, requests regarding IMS sessions, and media flows and a receiver 610 is configured to receive messages, information, requests regarding IMS sessions, and media flows. Transmitter 605 and receiver 610 may have a wireless interface, a wireline interface, or a combination thereof.

A resource allocation unit 620 is configured to allocate network resources for delivering media flows. For example, resource allocation unit 620 may allocate network resources for replicating media flows of an existing IMS session to a communications device. A session setup unit 622 is configured to setup sessions between communications devices, users, and so on. Session setup unit 622 is also configured to tear down sessions. A notification unit 624 is configured to process a request to add a user and/or communications device to an existing IMS session, and to send a request to the remote end of an existing IMS session to allow or disallow the addition of the user and/or communications device. Notification unit 624 may use out-of-band signaling and/or in-band signaling to send a request to the remote end. Memory 630 is configured to support requests, resource utilization, sessions, and so forth.

The elements of device 600 may be implemented as specific hardware logic blocks. In an alternative, the elements of device 600 may be implemented as software executing in a processor, controller, application specific integrated circuit, or so on. In yet another alternative, the elements of device 600 may be implemented as a combination of software and/or hardware.

As an example, transmitter 605 and receiver 610 may be implemented as a specific hardware block, while resource allocation unit 620, session setup unit 622, and notification unit 624 may be software modules executing in a processor 615, a microprocessor, a digital signal processor, a custom circuit, a custom compiled logic array of a field programmable logic array.

Figure 7:
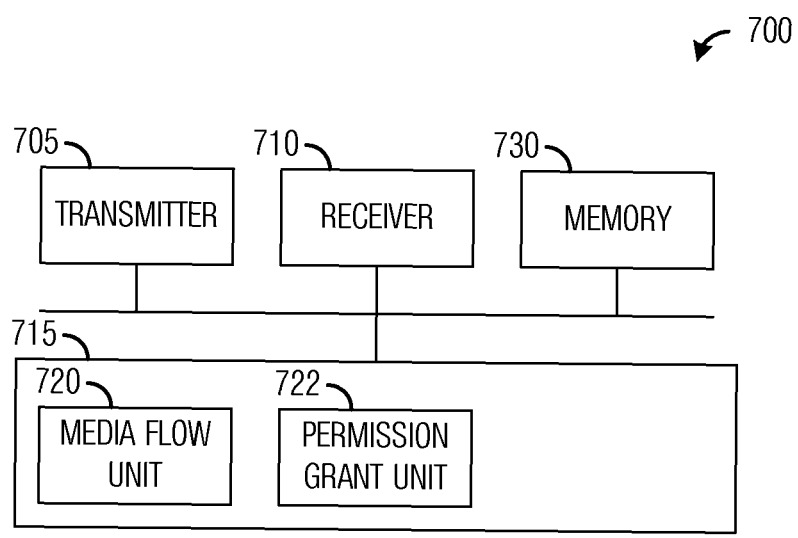
FIG. 7 illustrates an example second device according to example embodiments described herein.

FIG. 7 provides an alternate illustration of a device 700. Device 700 may be an implementation of a communications device, such as a communications device located at a remote end of a communications system. Device 700 may be used to implement various ones of the embodiments discussed herein. As shown in FIG. 7, a transmitter 705 is configured to send messages, information, and media flows and a receiver 710 is configured to receive messages, information, and media flows. Transmitter 705 and receiver 710 may have a wireless interface, a wireline interface, or a combination thereof.

A media flow unit 720 is configured to process media flows, such as those to be sent or received in an IMS session, including preparing media flows for sharing with other devices, preparing media flows for display, saving, and so on, in device 700. A permission grant unit 722 is configured to determine whether or not to allow or disallow a request to add a new user or device to an existing IMS session. Permission grant unit 722 is configured to respond to prompts regarding requests to add the new user or device, or use default responses. Memory 730 is configured to store media flows, information about privacy and billing concerns, and so forth.

The elements of device 700 may be implemented as specific hardware logic blocks. In an alternative, the elements of device 700 may be implemented as software executing in a processor, controller, application specific integrated circuit, or so on. In yet another alternative, the elements of device 700 may be implemented as a combination of software and/or hardware.

As an example, transmitter 705 and receiver 710 may be implemented as a specific hardware block, while media flow unit 720 and permission grant unit 722 may be software modules executing in a processor 715, a microprocessor, a digital signal processor, a custom circuit, or a custom compiled logic array of a field programmable logic array.

The above described embodiments of device 600 and device 700 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 3a, 3b, 3c, 5a, 5b, and 5c—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
   receiving a request from a first communications device to replicate a media flow that is being transmitted to the first communication device from a second communications device during an Internet Protocol Multimedia Subsystem session, wherein the request requests that a replica of the media flow be provided to a third communications device and wherein the second communications device is operated by a remote user;
   allocating resources to a transmission of the replica of the media flow to the third communications device;
   setting up an access leg to the third communications device for conveyance of the allocated resources;
   after the allocating resources and the setting up the access leg, notifying the remote user of the request;
   determining a response of the remote user to the request;
   when the response of the remote user comprises an affirmative response, establishing control of a collaborative session at an application server that supports a user of the first communications device; and
   when the response of the remote user comprises a negative response, deallocating the allocated resources.

2. The method of claim 1, wherein notifying the remote user comprises embedding a notification in a media flow to the second communications device.

3. The method of claim 1, wherein determining the response of the remote user comprises decoding a received response from the remote user.

4. The method of claim 1, wherein determining the response of the remote user comprises selecting a default response after determining that the response has not been received from the remote user.

5. The method of claim 4, wherein the default response comprises the affirmative response, and wherein the method further comprises establishing control of the collaborative session at the application server that supports the user of the first communications device.

6. The method of claim 1, wherein notifying the remote user comprises performing an "Update Remote Leg" transaction with the second communications device.

7. The method of claim 6, wherein the "Update Remote Leg" transaction comprises a session initiation protocol message with a session description protocol information element.

8. The method of claim 6, wherein the "Update Remote Leg" transaction comprises an a=target attribute.

9. The method of claim 6, wherein the response comprises an error code response.

10. The method of claim 1, wherein receiving the request to replicate the media flow comprises receiving a replicate request to replicate a plurality of media flows.

11. A method for communications device operations, the method comprising:
    receiving a request from a first communications device to replicate a media flow that is being transmitted to the first communications device from a second communications device during an Internet Protocol Multimedia Subsystem session, wherein the request requests that a replica of the media flow be provided to a third communications device and wherein the second communications device is operated by a remote user;
    setting up an access leg to the third communications device;
    after the setting up the access leg, notifying the remote user of the request;
    determining a response from the remote user indicating whether or not the remote user agrees to allow the third communications device to receive the replica of the media flow;
    in accordance with determining the remote user agrees, establishing control of a collaborative session at an application server that supports a user of the first communications device;
    in accordance with determining the remote user does not agree, releasing the access leg; and
    responding to the request responsive to the response from the remote user.

12. The method of claim 11, wherein the notifying comprises prompting the remote user.

13. The method of claim 12, wherein the prompting comprises displaying information about allowing the third communications device to receive the replica of the media flow.

14. The method of claim 12, wherein the prompting comprises playing an audible tone, playing a recorded message, displaying a graphic, displaying a picture, or combinations thereof.

15. The method of claim 11, further comprising receiving the response of the remote user.

16. The method of claim 15, wherein the response of the remote user is based on privacy concerns or billing concerns of the remote user.

17. The method of claim 15, wherein responding to the request comprises forwarding the response.

18. The method of claim 11, wherein determining the response comprises determining that the remote user has not responded and wherein responding to the request comprises transmitting a default response.

19. The method of claim 11, wherein responding to the request comprises transmitting the response in a session initiation protocol response message.

20. The method of claim 19, wherein the session initiation protocol response message comprises an error code.

21. A device comprising:
  a receiver configured to receive a request from a first communications device to replicate a media flow that is being transmitted to the first communications device from a second communications device during an Internet Protocol Multimedia Subsystem session, wherein the request requests that a replica of the media flow be provided to a third communications device, and wherein the second communications device is operated by a remote user;
  a processor coupled to the receiver;
  a non-transitory computer-readable storage medium storing programming for execution by the processor, the programming including instructions to:
    allocate resources to a transmission of the replica of the media flow to the third communications device;
    set up an access leg to the third communications device for conveyance of the allocated resources;
    after the allocate resources and the set up the access leg, notify the remote user of the request, and to determine a response of the remote user to the request;
    establish control of a collaborative session at an application server that supports a user of the first communications device, when the response of the remote user comprises an affirmative response; and
    deallocate the allocated resources, when the response of the remote user comprises a negative response.

22. The device of claim 21, wherein the instructions to determine the response comprise instructions to determine the response in accordance with a received response from the remote user.

23. The device of claim 21, wherein the programming further comprises instructions to determine a default response in response to not receiving the response from the remote user.

24. The device of claim 21, wherein the instructions to notify the remote user comprise instructions to perform an "Update Remote Leg" transaction with the second communications device.

25. The device of claim 21, wherein the instructions to notify the remote user comprise instructions to embed a notification in a media flow to the second communications device.

26. The device of claim 21, wherein the instructions to receive the request to replicate the media flow comprise instructions to receive a replicate request to replicate a plurality of media flows.

27. A computer program product for operating a controller, the computer program product having a non-transitory computer-readable medium with a computer program embodied thereon, the computer program comprising:
  computer program code for receiving a request from a first communications device to replicate a media flow that is being transmitted to the first communication device from a second communications device during an Internet Protocol Multimedia Subsystem session, wherein the request requests that a replica of the media flow be provided to a third communications device and wherein the second communications device is operated by a remote user;
  computer program code for allocating resources to a transmission of the replica of the media flow to the third communications device;
  computer program code for setting up an access leg to the third communications device for conveyance of the allocated resources;
  computer program code for, after the allocating resources and the setting up the access leg, notifying the remote user of the request;
  computer program code for determining a response of the remote user to the request;
  computer program code for establishing control of a collaborative session at an application server that supports a user of the first communications device, when the response of the remote user comprises an affirmative response; and
  computer program code for deallocating the allocated resources, when the response of the remote user comprises a negative response.

28. The computer program product of claim 27, wherein the computer program code for notifying the remote user comprises computer program code for embedding a notification in a media flow to the second communications device.

29. The computer program product of claim 27, wherein the computer program code to determine the response comprises computer program code to determine the response in accordance with a received response from the remote user.

30. The computer program product of claim 27, wherein the computer program further comprises computer program code to determine a default response in response to not receiving the response from the remote user.

31. The computer program product of claim 27, wherein the computer program code to notify the remote user comprises computer program code to perform an "Update Remote Leg" transaction with the second communications device.

32. The computer program product of claim 27, wherein the computer program code to receive the request to replicate the media flow comprises computer program code to receive a replicate request to replicate a plurality of media flows.

* * * * *